(No Model.)

E. G. SHORTT.
STEAM PUMPING ENGINE.

No. 292,697. Patented Jan. 29, 1884.

WITNESSES:
W. W. Hollingsworth
Edw W Byrn

INVENTOR:
E. G. Shortt
BY Munn & Co
ATTORNEYS.

(No Model.) 5 Sheets—Sheet 4.

E. G. SHORTT.
STEAM PUMPING ENGINE.

No. 292,697. Patented Jan. 29, 1884.

WITNESSES:
W. W. Hollingsworth
Edw. W. Byrn

INVENTOR:
E. G. Shortt
BY Munn & Co
ATTORNEYS.

N. PETERS, Photo-Lithographer, Washington, D. C.

(No Model.) 5 Sheets—Sheet 5.

E. G. SHORTT.
STEAM PUMPING ENGINE.

No. 292,697. Patented Jan. 29, 1884.

WITNESSES:
W. W. Hollingsworth
Edw. W. Byrn

INVENTOR:
E. G. Shortt
BY Munn & Co.
ATTORNEYS.

United States Patent Office.

EDWARD G. SHORTT, OF CARTHAGE, NEW YORK.

STEAM PUMPING-ENGINE.

SPECIFICATION forming part of Letters Patent No. 292,697, dated January 29, 1884.

Application filed July 17, 1883. (No model.)

*To all whom it may concern:*

Be it known that I, EDWARD G. SHORTT, of Carthage, in the county of Jefferson and State of New York, have invented a new and useful Improvement in Direct-Acting Steam Pumping-Engines; and I do hereby declare that the following is a full, clear, and exact description of the same, reference being had to the accompanying drawings, forming part of this specification, in which—

Figure 1:
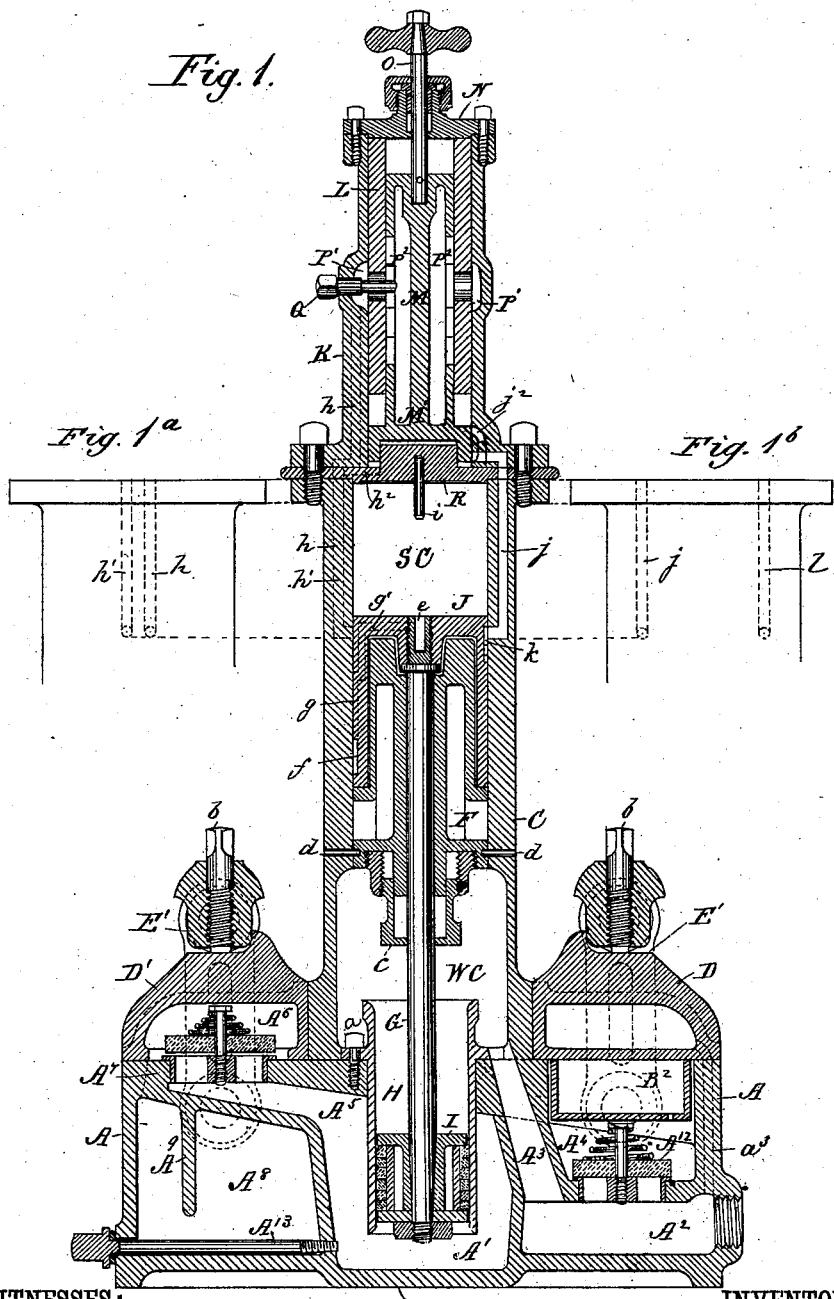
Figure 2:
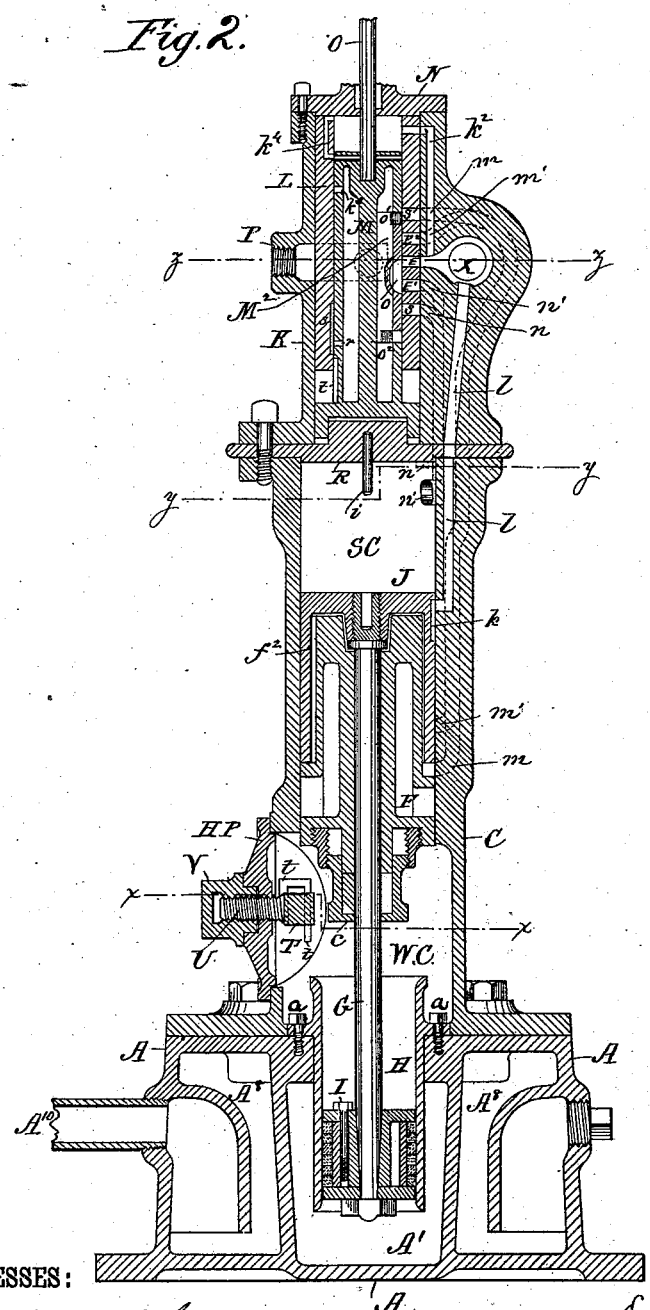
Figure 3:
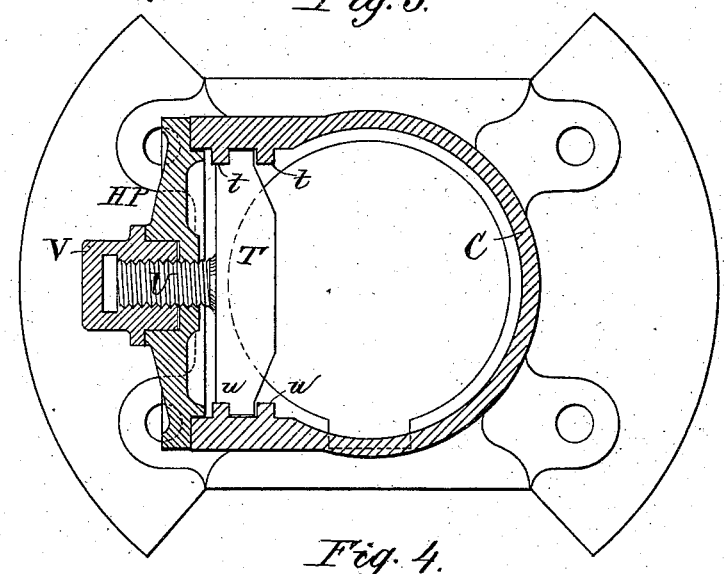
Figure 4:
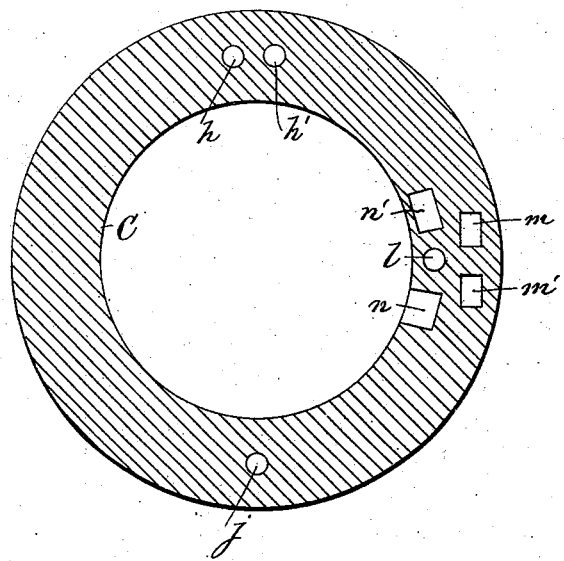
Figure 5:
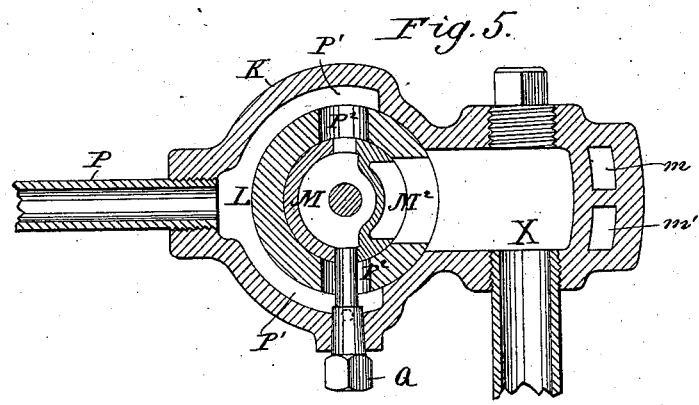
Figure 6:
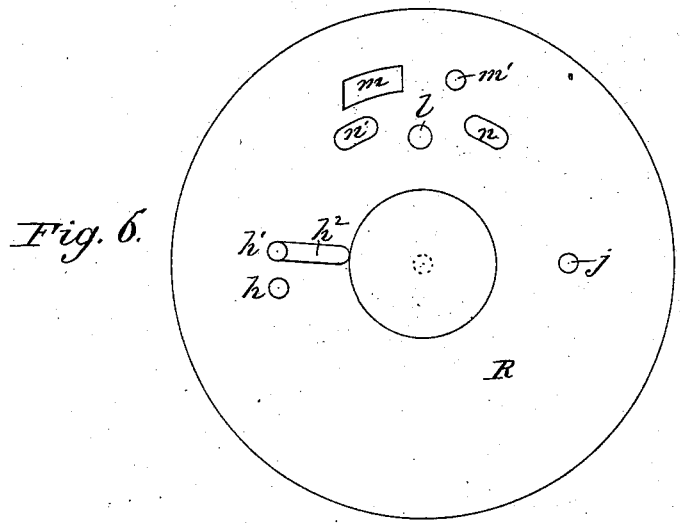
Figure 7:
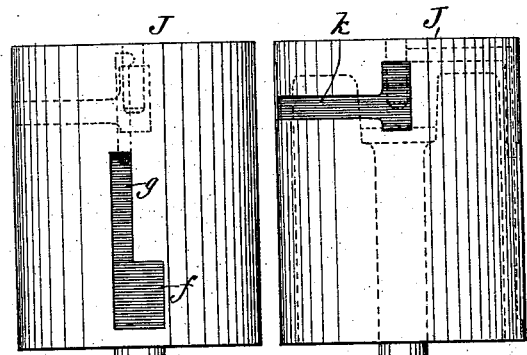
Figure 8:
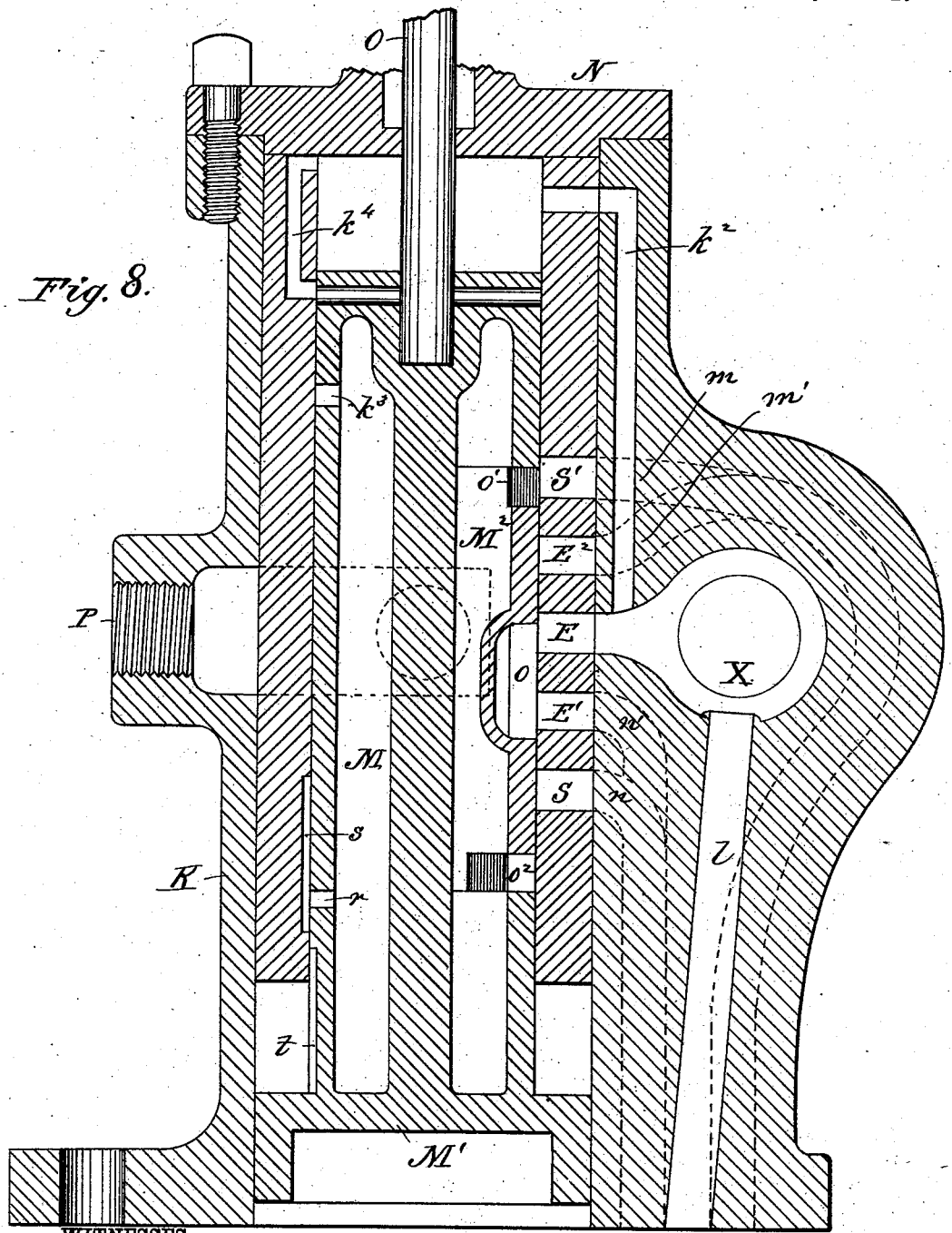

Figure 1 is a vertical central section through the engine. Figs. 1$^a$ 1$^b$ are side views of the upper part of the cylinder. Fig. 2 is a similar view taken in a plane at right angles to Fig. 1. Fig. 3 is a cross-section, on an enlarged scale, through the line $x\ x$ of Fig. 2. Fig. 4 is a cross-section, on an enlarged scale, through the line $y\ y$ of Fig. 2. Fig. 5 is a cross-section, on an enlarged scale, through line $z\ z$ of Fig. 2. Fig. 6 is an enlarged top view of the partition-plate or head R. Fig. 7 represents two side views (at right angles to each other) of the steam-piston. Fig. 8 is an enlarged view of the top of Fig. 2.

My invention relates to direct-acting pumping-engines in which the pump-piston and steam-piston are connected together and work in unison in a containing-case, one end of which forms the pump, and the other end of which is equipped with valves and ports, and forms a steam-engine within the same case, acting directly upon the pump.

My invention relates more particularly to my prior patent for a like invention, dated June 14, 1881, No. 242,995; and it consists in several features of improvement thereon, as will be hereinafter more fully described.

In describing my invention, I would state that I do not claim the lower or pump portion of the engine in this application, but have made it the subject-matter of a separate application, filed November 7, 1883, (Serial No. 111,098.) Inasmuch, however, as the engine and the pump are contrived with a certain degree of correlation, I deem it proper here to fully describe the pump as it exists in the organization of this direct-acting engine.

First, with respect to the pump, Figs. 1 and 2, A represents a cast-metal base, upon the middle portion of which is fastened by bolts an upright cylinder, C, while upon each side thereof are arranged caps D D', which cover openings in the base that give access to the valves, and which caps are held down by screws $b$, that pass through pivoted bails E', which may be swung over to one side, to permit the caps to be lifted off for giving access to the interior of the base, as shown in my prior patent. The cylinder C forms at its upper end a steam-chamber, S C, and at its lower end forms a water-chamber, W C, and between these two points is provided with a stationary head, F, forming a partition between said chambers, and which head or partition has a stuffing-box, $c$, through which passes the piston-rod G. The lower portion of the cylinder C is hollowed out to a thinner shell than the upper portion, and in the bottom of this lower portion, and attached to base A by screws $a$, is the plunger-barrel H, containing the water-plunger I. This barrel is open at both ends, and projects a short distance up into the water-chamber W C, and depends downwardly through a central hole in the base into a central chamber, A', of said base. In this base is formed the inlet-passage A$^2$, which communicates with the water-chamber W C through an upwardly-inclined passage, A$^3$, and which inlet-passage A$^2$ also communicates through valve A$^{12}$ and side passages, A$^4$, with the central chamber, A'. Leading from this central chamber there is a passage, A$^5$, which, through valve A$^6$, leads into the chamber beneath cap D', and this chamber communicates through passage A$^7$ with an air-chamber, A$^8$. This air-chamber has a pendent skirt or wall, A$^9$, with an opening at the bottom, which prevents the cushion of air in this chamber from escaping through passage A$^7$, and at its outlet A$^{10}$ has another such skirt or wall that prevents the air cushion from escaping from the chamber A$^8$ by this outlet. Now, in the operation of this pump, when the plunger I descends, it sucks water through inlet-passage A$^2$ and the passage A$^3$ into the water-chamber W C, and when said plunger rises it displaces or forces out the water above the plunger in chamber W C down the passage A$^3$, and at the same time this movement of the plunger creates a suction in A' and the passages A$^4$, which lifts the valve A$^{12}$, and allows the water expelled from W C to pass through this valve and the passages $A^4$ to the chamber $A'$ or lower side of the plunger. As the plunger now descends, it again fills chamber W C by suction from the source of supply and expels the water in chamber $A'$, through passage $A^5$, valve $A^6$, and passage $A^7$ down into the air-chamber $A^8$, and here this water compresses the air cushion, which, in expanding, causes the water to issue at the outlet $A^{11}$ in a nearly-continuous stream.
It will be seen in the operation of this part of my engine that in expelling the water from chamber $A'$ the plunger I is single-acting in effect only, but in filling this chamber it is double-acting, since it fills this chamber in rising, both by displacing or expelling the water from chamber W C, and also by creating a partial vacuum in $A'$ and the passages $A^4$, which causes the valve $A^{12}$ to rise and the water from the chamber W C to be transferred therethrough to chamber $A'$. This water, it will be seen, passes through the valve $A^{12}$ in preference to passing out the inlet-passage, for two reasons: first, for the reason that a suction exists upon the other side of the valve;
and, secondly, because it meets the ramming action or momentum of the water entering the inlet-passage $A^2$.

For draining the two chambers $A'$ and $A^8$, when the pump is not in use, a long screw-plug, $A^{13}$, is removed. The valves $A^6$ and $A^{12}$ are in the nature of disks playing upon a stem rising from spider-frame seats and backed by springs, as shown. The valve $A^{12}$ is located at a lower level than $A^6$, and has above it a hollow filling-block, $B^2$. The cap D also has within it an air-chamber having a communicating passage, $a^3$, to the water-inlet $A^2$. This allows the water, in its ramming action in entering inlet $A^2$, to surge up into the chamber in cap D through passage $a^3$, compressing the air and storing up water therein, as in a reservoir, which causes the suction of the pump to fill its chamber more quickly.

I will now describe the construction and operation of the steam end of the device.

The stationary head F, between the steam and water space, is made hollow for lightness and to avoid too great conductivity between the steam and water space, and it is tightly fitted in the cylinder C, being held by pins $d$ $d$, Fig. 1. This head projects upwardly into the steam-space in the form of a hollow boss of less diameter than the inner diameter of the cylinder, and upon and around it fits loosely the shell of an inverted-cup-shaped piston, J, Figs. 1, 2, and 7, connected to the piston-rod G by screw-threads. This piston fits snugly against the inner periphery of the cylinder, with a steam-tight joint; but, as before stated, does not closely fit the head F, but has a space between the inner surface of the piston-shell and the outer surface of the head or boss, which permits steam, when admitted to the lower end of the cylinder, to find a working-bearing at once against the whole area of the piston.

Upon the cylinder C there is fastened a head or partition plate, R, Figs. 1, 2, and 6, and above this a casing, K, and above this a head, N, with stuffing-box, through which there passes an operating-rod, O, with handle for moving the valve by hand in starting the engine. M is this valve, which is of a hollow cylindrical type, and which fits closely and reciprocates vertically in a shell, L, within the outer casing, K. The upper portion of this valve slides over ports and governs the admission of steam to and its exhaust from the steam-cylinder. The lower portion of the valve is made in the form of an inverted-cup-shaped piston, which is acted upon by steam to shift the valve over the main ports, the admission and exhaust of steam to and from the supplementary piston working the main valve being controlled, reciprocally, by the movement of main piston J, as hereinafter described.

The general arrangement of this part of the steam end of the engine is very similar to that shown and described in my prior patent referred to, and I will now describe more minutely the features which constitute the points of difference. The steam-cylinder is provided at each end with independent inlet and exhaust ports $m$ $m'$ and $n$ $n'$, Figs. 2, 4, and 8. The ports $m$ and $n$ open into the cylinder at the extreme ends thereof and constitute the inlet-ports, and the ports $m'$ and $n'$ open about an inch from the ends and constitute the exhaust-ports. The object of this is to allow the piston to catch a portion of steam after it passes the exhaust-ports, to form a cushion and avoid the hammering action of the piston against the heads. The two ports $m$ and $m'$, which open below the piston, pass up side by side in the wall of the cylinder C and the upper casing, K, and open, (see Figs. 2 and 8,) respectively, into the exhaust-orifice $E^2$ of shell L and into steam-orifice $S'$ of said shell. The ports $n$ and $n'$, which open into the steam-cylinder above the piston, pass up side by side in the wall of the cylinder C and the casing K, and open, respectively, into the exhaust-orifice $E'$ of the shell L, and into the steam-orifice S of said shell. The plate R is provided with holes (see Fig. 6) which register with these ports. As, however, the exhaust from the under side of the piston on the downstroke is assisted by the weight of the piston and its rod, I make the exhaust-orifice $m'$ from below the piston of less size than $n'$ above the piston, as shown in Fig. 6, which reduced size, by retarding the exhaust on this stroke, acts as a counter-balance to the weight of the piston and makes it uniform in its action. The exhaust-port $m'$, however, is only made of reduced size where it passes through the plate R.

Between the exhaust-orifices $E'$ $E^2$ of the shell L, surrounding the valve, there is an intermediate exhaust-orifice, E, Figs. 2 and 8, which is always in communication with the general exhaust-pipe X. Now, the valve M is provided, about its middle and upon its outer periphery, with a recess or elongated channel, o, adapted to play over the three exhaust-orifices E E' E², and cover two of them at a time. On each side of this recess there is a steam-orifice, o' and o², adapted to register with the steam-orifices S and S', and leading to the interior or hollow chamber of the valve. This valve and also its shell L have opposite openings, P², in their sides, (see Figs. 1 and 5,) which are always in open communication with the branched steam-passages P', leading around the casing from the main inlet-pipe P. Now, it being understood that steam is always in the chamber of valve M, when this valve is in the position shown in Figs. 2 and 8, the following actions are taking place: Live steam is flowing through o' to S' and through port m to the lower end of the cylinder, and is starting the piston up, while the exhaust-steam above the piston is being discharged through port n' to orifice E', through recess o in the valve to E, and thence to the general exhaust X.

When the piston has risen to its highest point and the valve M has also been shifted to a higher point, by means hereinafter described, the following action takes place: o' passes out of registration with S', and o² passes into registration with S, and the recess o covers the exhaust-ports E and E². Live steam then passes through o² and S to port n and the upper end of the cylinder, and the exhaust below the piston passes up m' to E², through recess o to E, and thence to the general exhaust X.

To prevent valve M from turning axially, which would throw its orifices o o' o² out of registration with E E' E² S S', a guide-bolt, Q, is made to fit in a vertical slot in the valve, as shown in Figs. 1 and 5.

I will now proceed to describe how the main piston J is made to shift the steam-valve M for controlling the flow of steam to and from the steam-cylinder. This piston, it will be observed, is of an inverted-cup shape, and its cylindrical shell portion is made longer than the length of the stroke, and its periphery is made to act as a slide-valve in controlling the flow of steam to and from the under side of the valve M M'. For this purpose the said piston has on its outer periphery a vertical recess, $f g$, Figs. 7 and 1, of which the lower portion, $f$, is twice the width of $g$, and of which $g$ leads through a channel $g'$, Fig. 1, to a central hole, $e$, in the top of the piston which is most of the time in communication with the steam-space above.

Leading from one of the steam-passages P' there is a port, $h$, formed in the wall of the casing K, and which runs down through the plate R, and also in the wall of the cylinder C, and opening through the inner periphery of the cylinder against the side of the piston. Just beside this port in the cylinder there is another, $h'$, exactly like it terminating on the same level below and extending only up to the plate R and opening into a radial channel, $h^2$, Figs. 1 and 6, which leads to the chamber underneath the piston of the valve M. Now, when the piston J reaches its highest point its wide recess $f$ covers the lower ends of both ports $h$ and $h'$, and steam then passes from the branched passage P' down $h$ to wide recess $f$ of the piston; then crosswise to the mouth of port $h'$; then through $h'$ and the channel $h^2$ to the under side of the piston M' of the valve M. This serves to shift the valve and gives it its upward movement. Now, if steam were cut off from $h'$ at once by the descent of the piston, it would condense under the valve M M', and would not hold it up positively. I therefore elongate one side of the recess in the piston, as at $g$, Fig. 7, and this elongation is in the vertical plane of the port $h$, so that until the piston passes down a considerable distance the pressure of the steam under piston M' of the valve is maintained by steam taken from steam-chamber S C, and passing through hole $e$, passage $g'$, to recess $g$ in the piston, and thence up port $h'$ to channel $h^2$ and the chamber below valve-piston M'. It will therefore be seen that the steam taken through port $h$ shifts the valve, and, after the piston J starts down, the pressure under the valve is maintained by steam from the cylinder S C.

To bring the valve M M' down, the steam is exhausted from the lower side of its cup-shaped piston, as follows: Leading from the lower side of said piston is a port, $j$, Fig. 1, which descends through the wall of the cylinder, and opens through the side of the same against the periphery of the piston. This piston has near its top a horizontal recess, $k$, extending about one-fourth around the same. One end of this recess, when the piston is at the lower end of its stroke, covers the lower end of port $j$; and the other end of the recess covers the lower end of a port $l$, Figs. 1 and 2, formed in the wall of the casing K and cylinder C, and leading to the general exhaust. It will thus be seen that when the piston J reaches the end of the downstroke, and the valve M M' requires to be changed, steam is discharged from the lower side of the valve-piston M', through port $j$, recess $k$ in the piston, and port $l$ to the general exhaust.

The function of the central pin, $i$, depending from plate R, will now be described. This pin exactly fits the hole or recess $e$ in the top of the piston, and when the piston is at the upper end of the cylinder the said pin $i$ closes the orifice of port $g'$, Fig. 1. This is very necessary to prevent waste of steam, for it will be observed that live steam is at this time in the ports $h$ $h'$ and the recesses $f$ and $g$, and the stoppage of port $g'$ by pin $i$ prevents live steam from passing into the cylinder above the piston and passing out of the same with the exhaust.

With respect to the operation of the valve-piston M', it will be seen that, as in my prior patent, the area of the steam-pressure on the under side of said piston is much greater than it is upon the top side, and this piston is worked on its upstroke by the excess of pressure on its under side over and above this pressure on the upper side, and on the downstroke is worked solely by the pressure of steam on the upper side, the steam below it being exhausted through ports $j$ and $l$, as before described.

The object in making the piston M' cup-shaped is to give its sides a long bearing against the walls of casing K, and still preserve its lightness; and the reason the cup is inverted is to permit the water of condensation to drain out of the same through the passage-way $h^2$. The steam which supplies the space above the piston M' is taken from the interior of the valve through the hole $r$, Figs. 2 and 8, and the passage-ways $s\,t$, one of which, $s$, is formed in the inner periphery of the shell L, and the other, $t$, in the outer surface of the cylindrical portion of the valve M, and which two passage-ways pass into registration soon after the valve starts on its upward movement.

To prevent the valve M M' from hammering the heads N and R, I cushion the valve with live steam at each end, as follows: The exhaust-port $j$, Fig. 1, opens into the chamber below piston M' a short distance above the lower end of the chamber, and just when the piston M' cuts off this exhaust live steam passes from the upper side of this piston to the lower side through the passage $j^2$, thus cushioning the valve on its downstroke. An exhaust-passage, $k^2$, Fig. 2, also leads from above the valve M to the general exhaust, and also opens into the casing a short distance below the end of the upstroke, and as soon as the valve M cuts off this exhaust live steam passes through the hole $k^3$ in the valve and through the passage $k^4$ in the shell to the upper side of the valve, thus cushioning the valve on its upstroke.

In working this pumping-engine it is very desirable to have means provided for affording access to the stuffing-box $c$ and the water-plunger I, for tightening up the same; and for this purpose I construct the lower end of the cylinder C with a laterally-opening hand-hole opening into the chamber W C, as follows:

Referring to Figs. 2 and 3, the chamber W C has a lateral opening, of circular form, covered by a head-plate, H P, which is held upon the face of the opening by a turn-bar, T, having a screw-stem, U, which passes through the head-plate, and is provided with a nut, V, which forces the head-plate to a solid and tight bearing against the face of the opening. The turn-bar T has at each end a tongue that fits in the recess between the flanges $t\,t\,u\,u$, and one of the said sets of flanges, $t\,t$, has an outlet at the bottom and the other at the top, so that in fitting the turn-bar it is inserted in a nearly-vertical position and is then turned horizontally into the grooves between the flanges.

In the engine as thus described it will be seen that the piston J has the primary function of a piston and a secondary function of a slide-valve controlling steam to the main valve above, and the main valve M M' above has a primary function of a valve to control the flow of steam to the main piston and a secondary function of a piston to give it the necessary motion. The main piston and main valve, therefore, have a reciprocal relation to each other, operating together automatically and smoothly without any direct or positive connection. As the piston J is round, and might turn axially out of registration with the ports in the cylinder, I form on the inner wall of the piston-shell a rib or feather, $f^2$, Fig. 2, that enters a groove in the boss of the head F, which prevents the piston from turning.

In the construction of the valve M, I make the part $M^2$, which bears against the perforated side of shell L, in a separate piece, fitted, however, snugly in the cylindrical periphery of the valve and forming a segment thereof. The object of this is to cause the steam to press the part $M^2$ to close contact with the wearing-surfaces about the orifices E, S, &c., so as to take up looseness due to wear, and thus make a tight steam-joint at this point.

One of the most prominent peculiarities of this pump is its automatic valve-gear and quick-return plunger, which moves down at a given speed and rises more quickly. Its steam-valve is operated without the aid of tappets, compound levers, cams, or metallic connections of any kind. It neither strikes a blow nor operates suddenly upon the plunger. The piston cushions noiselessly upon steam at the end of each stroke, recedes gradually for an instant until the water-valves close, and then completes its stroke. There is no outside moving gear or delicate adjustment. In the steam-chest there are but two pieces, a slide-valve and a differential piston to move the valve, which constitute the entire valve-gear. The steam-piston and water-plunger are cast in one piece of steel or composition, as desired. The stuffing-boxes and water-valve seats are made of composition. The links and bolts that hold the valve-caps are steel, and all other bolts are case-hardened. The supply, exhaust, suction, and discharge openings are right and left, and all joints are ground to a fit. It has but two water-valves, though possessing the same advantages, as respects a steady flow, as the double-acting pump, by reason of the quick return of the plunger and the creating of suction power on both the up and down stroke. The quick return movement of the piston prevents any vibration or quake that usually accompanies quick reciprocating motion. There is no motion of any kind in view, except the valve-stem at the very top of the pump, which moves about one inch, and that is entirely covered, when desired, for mining or other purposes. On the side of the cylinder there is an opening for the purpose of easily and quickly getting to the main stuffing-box by removing a single bolt. By reason of the entire absence of metallic connections, cams, compound levers, or tappets, a more rapid stroke can be attained than by any other pump without jar or noise. By reason of suction-power on both strokes of the piston, and by its quick return, a flow is attained as steady as by double-acting pumps. The pump being vertical, there is no wear to the cylinder or piston occasioned by the weight of the piston, as is the case with horizontal pumps, and hence is far more durable. The power of the steam acting directly upon the water-plunger is an economy of steam-power. There can be no such thing as dead-centers, and hence it can be operated slower than any pump in use. It can be run with economy, at one stroke or five hundred strokes per minute. It is perfectly noiseless, so that a person might stand within a few feet of it and not hear the motion, even though running at five hundred strokes per minute. All joints are carefully ground to a fit, thus avoiding the frequent blowing out of packing and the delay and expense attending it. The pump being vertical, all foreign substances pass under or below the plunger, thus preventing all abrasions or cutting, so destructive to other pumps.

This pump is so arranged that a different water-cylinder may at any time be put in at trifling cost, if greater power or greater capacity is desired, without the expense of a new pump.

Having thus described my invention, what I claim as new is—

1. The combination, with the cylinder C and partition F, and a suitable steam-valve, of the piston J, rod G, plunger I, and smaller open-end cylinder H, protruding into the lower end of cylinder C, substantially as shown and described.

2. The combination, with the cylinder C, having hand-hole with detachable head-plate H P, and a suitable steam-valve, of the partition F, and piston J, arranged above the hand-hole, the rod G, the plunger I, and the smaller open-end cylinder H, arranged below the hand-hole and projecting into the lower end of cylinder C, substantially as shown and described.

3. The combination of the steam-piston, its cylinder having the induction-ports $n$ and $m$, opening into the extreme ends thereof, and the exhaust-ports $n'$ and $m'$, opening at some distance from the ends to cushion the steam, the valve M, having live-steam openings $o'$ $o^2$ and exhaust-channel $o$, and the shell L, having live-steam openings S S' and exhaust-openings E E' $E^2$, substantially as and for the purpose described.

4. In a direct-acting engine, the combination of the steam-piston and the main steam-valve, arranged in alignment and inclosed by a case having ports therein, the piston having the primary function of transmitting working-power and the secondary function of a slide-valve to operate the main steam-valve, and the main steam-valve having the primary function of regulating steam to the main steam-piston and the secondary function of a piston operated in turn by the working-piston, the two being disconnected, as described.

5. The combination, with the valve M, having piston M', of the casing K, having port $h$, leading from the steam-supply, plate R, having passage-way $h^2$, cylinder C, having two ports, $h$ $h'$, side by side, and the piston having recess $f$ for admitting steam to the lower end of the valve, as set forth.

6. The combination, with the valve M, having piston M', of the casing and cylinder having ports $j$ and $l$, and the piston J, having passage-way $k$ for exhausting the steam from beneath the valve, as described.

7. The combination of the piston with hole $e$, port $g'$, and elongated recess $g$, the cylinder having port $h'$, and the plate R, having passage-way $h^2$, whereby the pressure of steam below the valve-piston M' is maintained by open communication with the steam-chamber S C after steam from port $h$ has been cut off, as set forth.

8. The inverted-cup-shaped piston constructed as a slide-valve with recesses, combined with the boss F, of less diameter, and having a feather-and-groove connection therewith to prevent turning axially, as described.

9. The steam-valve M, combined with the case having ports at each end to form a steam-cushion at each end, and with the main steam cylinder and piston arranged in alignment with the valve, said piston being disconnected from the said valve and arranged to operate the same through live steam admitted to the valve through ports controlled by the piston, substantially as described.

10. The valve M, having its side $M^2$, which is opposite the orifices E S, made separate and held in close contact with the metal forming said orifices by the live steam, as described.

EDWARD G. SHORTT.

Witnesses:
JAMES H. GRIDLEY,
SOLON C. KEMON.